United States Patent [19]

Wretborn et al.

[11] Patent Number: 5,354,479
[45] Date of Patent: Oct. 11, 1994

[54] METHOD FOR PURIFYING PROCESS WATER OR WASTEWATER CONTAINING WOOD RESIN

[75] Inventors: Magnus Wretborn; Arne Andersson, both of Stenungsund; Gunnar Göransson, Lilla Edet, all of Sweden

[73] Assignee: EKA Nobel AB, Surte, Sweden

[21] Appl. No.: 54,251

[22] Filed: Apr. 30, 1993

[30] Foreign Application Priority Data

May 5, 1992 [SE] Sweden ............................ 9201398-6

[51] Int. Cl.$^5$ ............................................. C02F 1/56
[52] U.S. Cl. ................................. 210/728; 162/189; 210/727; 210/730; 210/732; 210/928
[58] Field of Search ............... 210/705, 712, 725, 727, 210/728, 730, 732, 928; 162/189

[56] References Cited

U.S. PATENT DOCUMENTS

| | | | |
|---|---|---|---|
| 3,338,828 | 8/1967 | Clark | 210/730 |
| 3,926,951 | 11/1975 | Lindenfors et al. | 260/231 A |
| 5,104,551 | 4/1992 | Davis et al. | 210/727 |
| 5,178,770 | 1/1993 | Chung | 210/705 |
| 5,230,808 | 7/1993 | Chung et al. | 210/732 |

FOREIGN PATENT DOCUMENTS

| | | |
|---|---|---|
| 1004782 | 2/1977 | Canada . |
| 2023735 | 2/1992 | Canada . |
| 0321989 | 6/1989 | European Pat. Off. . |
| 2412014 | 10/1974 | Fed. Rep. of Germany . |
| 132275 | 7/1975 | Norway . |
| 454507 | 11/1986 | Sweden . |

OTHER PUBLICATIONS

Chemical Abstracts, vol. 115, No. 2, Jul. 15, 1991, (Columbus, OH), p. 390 abstract 14859s, & US, 596669.

*Primary Examiner*—Peter A. Hruskoci
*Attorney, Agent, or Firm*—Birch, Stewart, Kolasch & Birch

[57] ABSTRACT

Wood-resin-containing process water or wastewater from the pulp industry is purified by adding, as flocculants, a high-molecular-weight polyethylene oxide and a water-soluble, non-ionic cellulose ether, suitably having a flocculation temperature of 35°–80° C. The added amount per liter of water is preferably 2–20 mg of the high-molecular-weight polyethylene oxide and preferably 5–30 mg of the non-ionic cellulose ether.

9 Claims, No Drawings

METHOD FOR PURIFYING PROCESS WATER OR WASTEWATER CONTAINING WOOD RESIN

The present invention relates to a method for purifying process water or wastewater containing wood resin, by adding a high-molecular-weight polyethylene oxide and a water-soluble, non-ionic cellulose ether as flocculants.

In the making of pulp, the pulp washing step yields process water and wastewater containing a number of undesired substances and products, such as resin, hemicellulose, lignin and fines. Such process water and wastewater give rise, among other things, to discoloration of the pulp as well as high oxygen consumption upon emission into a water recipient. There is thus a manifest need to be able to reduce, as far as possible, the contents of these substances and products.

It is generally known, e.g. from Canadian Patent 1,004,782, to add a high-molecular-weight polyethylene oxide and a phenolformaldehyde resin to wastewater from the pulp industry with a view to removing such undesired products by flocculation. A similar process is known from Swedish Patent Publication 454,507, where, in addition to a high-molecular-weight polyethylene oxide and a phenolformaldehyde resin, a cationic starch or cellulose derivative is added.

It has however been found that it is difficult to bring about effective purification of wood-resin-containing process water or wastewater without using high contents of high-molecular-weight polyethylene oxide. It is however desirable to reduce the amount of high-molecular-weight polyethylene oxide, since it is difficult to produce and hence is very expensive, as well as to further improve the degree of purification of the resin-rich process water or wastewater.

It has now been found that surprisingly effective purification of wood-resin-containing process water or wastewater from the pulp industry can be achieved by adding a water-soluble, non-ionic cellulose ether, preferably having a flocculation temperature of 35°–80° C., and a high-molecular-weight polyethylene oxide as flocculants. The content of wood resin in the process water or wastewater may vary within wide limits. Even at as low contents as 0.1 g/l water, significant effects are achieved, although this content generally amounts to at least 0.4 g/l water, measured according to the method described in SE 8403587-2. Normally, the content does not exceed 50 g/l water. For process water or wastewater originating from the making of mechanical pulps, the resin content preferably is 0.7–2 g/l water, while the resin content of process water or wastewater from the production of chemical pulps, such as sulphite pulp, preferably is 10–20 g/l water. The amount of the added high polymer polyethylene oxide and the non-ionic cellulose ether should suitably be conformed to the amount and the type of the undesired substances and products. Generally, the amount of high-molecular-weight polyethylene oxide is at least 1 mg/l water, preferably 2–20 mg/l water, and the amount of non-ionic cellulose ether generally is at least 3 mg/l water, preferably 5–30 mg/l water. The weight ratio of high-polymer polyethylene oxide to non-ionic cellulose ether generally is 2:1–1:5, preferably 1:1–1:4.

The method according to the invention yields excellent purification, especially when the treated process water or wastewater contains considerable amounts of wood resin, e.g. above 10 g/l. Solids in the water, e.g. in the form of fines, do not interfere with the process. The process water or wastewater to be treated should have a pH within the range of 1–9, preferably 5–6 for chemical pulp, such as sulphite pulp or sulphate pulp, and a pH of 7–9 for mechanical pulps, such as CTMP and TMP. The result of the purification is promoted if the process water or wastewater in the purification process has a temperature above room temperature, preferably a temperature of 35°–70° C.

The high-molecular-weight polyethylene oxide suited for use in the method according to the invention should have a molecular weight above 500,000, and most preferred above 2,000,000. No critical upper limit has been observed, and good results have thus been obtained by using polyethylene oxide having a molecular weight of about 6,000,000. Essentially higher molecular weights have proved difficult to obtain because of chain-shortening in the production. The polyethylene oxide according to the invention is mainly made up of oxyethylene groups, but a small amount of other groups may also be included, such as oxypropylene. The amount of groups other than oxyethylene should only be so high as to allow the polyethylene oxide to be water-soluble.

The water-soluble, non-ionic cellulose ether, which is soluble in an amount of at least 1 g/l water at 20° C., preferably has a turbidity point of 35°–80° C. in a 1% aqueous solution. Such cellulose ethers may contain alkyl groups, such as methyl, ethyl, propyl and butyl groups; as well as hydroxyalkyl groups, such as hydroxyethyl, hydroxypropyl and hydroxybutyl groups. Especially preferred cellulose ethers are alkylhydroxyalkyl cellulose, such as ethylhydroxyethyl cellulose, propylhydroxyethyl cellulose, methylhydroxyethyl cellulose and methylethylhydroxyethyl cellulose. Other suitable cellulose ethers are methyl cellulose and cellulose ethers having more than one type of hydroxyalkyl group, such as hydroxyethylhydroxypropyl, hydroxyethylhydroxybutyl, hydroxypropylhydroxybutyl and their equivalents containing methyl and ethyl groups as well.

In the application of the invention, the high-polymer polyethylene oxide and the non-ionic cellulose ether are suitably dissolved in water and added in dissolved form to the process water or wastewater. The additions can be made continuously or batchwise. Good results are achieved if the additions are made simultaneously, although it is preferred to first add the non-ionic cellulose ether and then the high-molecular-weight polyethylene oxide. The difference in time between the additions is dependent on the design of the technical equipment, but generally amounts to 4–20 sec. If so desired, both the cellulose ether and the high-molecular-weight polyethylene oxide can be added in more than one place. Moreover, it should be ensured that the two flocculation chemicals are properly admixed.

The separation of the flocculated resin-containing products is preferably done be flotation by means of air, e.g. by froth flotation or microflotation, where small air bubbles lift the flocculated material to the surface. The resulting froth is then removed in conventional manner. It is also possible to remove the flocs from the process water or wastewater by sedimentation or filtration.

The invention will be further illustrated by the following Examples.

EXAMPLE 1

To a process water (pH 5.0, temperature 70° C.) originating from a sulphite pulp and containing 15 g wood resin per liter process water were added, under vigorous agitation, a cellulose ether and/or a high-molecular-weight polyethylene oxide as flocculants according to the Table below. When the cellulose ether as well as the high-molecular-weight polyethylene oxide were used as flocculants, the polyethylene oxide was added about 10 sec after the cellulose ether. After the addition of the cellulose ether and/or the polyethylene oxide, only gentle agitation was performed, whereupon the mixture was left for 5 min to allow the flocculated material to settle. Samples were drawn from the supernatant and analysed for turbidity by means of a turbidimeter. Low turbidity means a good reduction of colloidal and particulate substances. The following results were obtained.

| Test | Cellulose ether Type | ppm mg/l | Polyethylene oxide molecular weight 5.5 × 10$^6$ ppm | Turbidity NTU |
| --- | --- | --- | --- | --- |
| 1 | — | — | — | 700 |
| 2 | A[1] | 10 | — | 600 |
| 3 | A | 20 | — | 550 |
| 4 | B[2] | 10 | — | 600 |
| 5 | B | 20 | — | 600 |
| 6 | — | — | 10 | 520 |
| 7 | — | — | 20 | 115 |
| 8 | A | 10 | 10 | 140 |
| 9 | A | 20 | 10 | 60 |
| 9 | B | 10 | 10 | 300 |
| 10 | B | 20 | 10 | 240 |

[1] A = low-viscosity ethyl hydroxyethyl cellulose, turbidity point about 69° C., viscosity about 1000 cP (1% solution, temperature 20° C.)
[2] B = methyl hydroxyethyl cellulose, turbidity point about 70° C.

The results show that the use of flocculants according to the invention gives a very high reduction of colloidal and particulate substances for a low content of added high-molecular-weight polyethylene oxide.

EXAMPLE 2

The same procedure was adopted as in Example 1, but with the exception that the water was wastewater having a temperature of 35° C. and a pH of 7.2 and originating from the making of bleached CTMP pulp. The amount of suspended substances, TSS-GP/A, was determined at 870 mg/l by filtering the wastewater through a Whatman filtering paper designated GF/A. The amount of wood resin was 0.9 g/l water. After sedimentation, samples were drawn from the supernatant which was analysed in respect of suspended substances according to TSS-GF/A above. The following results were obtained.

| Test | Cellulose ether Type | ppm | Polyethylene oxide molecular weight 5.5 × 10$^6$ ppm | TSS-GF/A mg/l |
| --- | --- | --- | --- | --- |
| 1 | A | 8 | — | 500 |
| 2 | — | — | 3 | 220 |
| 3 | A | 8 | 3 | 100 |

The results show that a combination of flocculants according to the invention provides surprisingly good purification.

EXAMPLE 3

The same procedure was adopted as in Example 1, but with the exception that process water having a wood resin content of 17 g/l and originating from the making of sulphite pulp was purified. The pH of the process water was 5.6, temperature 60° C. and turbidity >1000 NTU. The following results were obtained.

| Test | Cellulose ether Type | ppm | Polyethylene oxide molecular weight 5.5 × 10$^6$ ppm | Turbidity NTU |
| --- | --- | --- | --- | --- |
| 1 | — | — | — | >1000 |
| 2 | — | — | 10 | >1000 |
| 3 | — | — | 15 | 320 |
| 4 | — | — | 20 | 180 |
| 5 | A | 10 | — | >1000 |
| 6 | A | 20 | — | >1000 |
| 7 | C[1] | 10 | — | >1000 |
| 8 | A | 5 | 10 | 430 |
| 9 | A | 10 | 10 | 370 |
| 10 | A | 20 | 10 | 145 |
| 11 | C | 5 | 10 | >1000 |
| 12 | C | 10 | 10 | 440 |
| 13 | C | 20 | 10 | 175 |

[1] C = high-viscosity ethyl hydroxy ethyl cellulose, turbidity point about 69° C., viscosity 5000 cP (1% solution, 20° C.).

The results show that by using both a cellulose ether and a high-molecular-weight polyethylene oxide, it is possible to achieve excellent purification with a relatively low content of the high-molecular-weight polyethylene oxide.

EXAMPLE 4

To process water having a pH of 11.2 and a resin content of 490 mg/l from the making of birch pulp was added sulphuric acid in an amount to bring its pH to 7.8. Then, a purification process was carried out at 70° C. according to Example 1, ethyl hydroxyethyl cellulose C according to Example 3 and/or polyethylene oxide according to Example 3 were added as flocculants. After purification, turbidity was determined and the resin content was measured according to the method disclosed in SE 8403587-2. The following results were obtained.

| Test | Cellulose ether ppm | Polyethylene oxide ppm | Turbidity NTU | Resin content mg/l |
| --- | --- | --- | --- | --- |
| 1 | 0 | 0 | 900 | 490 |
| 2 | 0 | 2 | 190 | 160 |
| 3 | 0 | 4 | 60 | 90 |
| 4 | 0 | 8 | 30 | 70 |
| 5 | 5 | 0 | 850 | 470 |
| 6 | 2 | 2 | 55 | 75 |
| 7 | 4 | 2 | 25 | 60 |
| 8 | 6 | 2 | 16 | 45 |

The results show that a combination of flocculants according to the invention has a very clear synergistic effect.

We claim:
1. A method for purifying a process water or a wastewater which contains a wood resin, the method comprising:
adding a high-molecular-weight polyethylene oxide and a water-soluble non-ionic cellulose ether to the process water or the wastewater in an amount sufficient to flocculate the wood resin therein, wherein said polyethylene oxide has a molecular weight above 500,000, and is added in an amount of at least 1 mg/l of water to the process water or the wastewater, and the non-ionic cellulose ether is added in an amount of at least 3 mg/l of water to the process water or the wastewater, and separating the flocculated wood resin from the process water or the wastewater.

2. A method as claimed in claim 1, wherein the turbidity point of the cellulose ether in a 1% aqueous solution is 35°-80° C.

3. A method as claimed in claim 1, wherein the cellulose ether is alkyl hydroxylalkyl cellulose.

4. A method as claimed in claim 1, wherein the cellulose ether is alkyl cellulose.

5. A method as claimed in claim 1, wherein the content of wood resin in the process water or the wastewater is at least 0.4 g/l water.

6. A method as claimed in claim 5, wherein the content of wood resin in the process water or the wastewater is 10-20 g/l water.

7. A method as claimed in claim 1, wherein the high-molecular-weight polyethylene oxide is added in an amount of 2-20 mg/l of water to the process water or the wastewater, and the non-ionic cellulose ether is added in an amount of 5-30 mg/l of water to the process water or the wastewater.

8. A method as claimed in claim 1, wherein the process water or the wastewater has a temperature above room temperature.

9. A method as claimed in claim 1, wherein the process water or the wastewater have a temperature of 35°-60° C.

* * * * *